(12) United States Patent
De Faveri

(10) Patent No.: US 9,447,912 B2
(45) Date of Patent: Sep. 20, 2016

(54) SUPPORT TRIPOD FOR VIDEO-PHOTOGRAPHIC EQUIPMENT

(71) Applicant: LINO MANFROTTO + CO. S.P.A., Cassola (PD) (IT)

(72) Inventor: Massimo De Faveri, Mussolente (IT)

(73) Assignee: LINOMANFROTTO+CO, SPA, Cassola (PD) (IT)

( * ) Notice: Subject to any disclaimer, the term of this patent is extended or adjusted under 35 U.S.C. 154(b) by 0 days.

(21) Appl. No.: 14/652,106

(22) PCT Filed: Nov. 20, 2013

(86) PCT No.: PCT/EP2013/074307
§ 371 (c)(1),
(2) Date: Jun. 12, 2015

(87) PCT Pub. No.: WO2014/090534
PCT Pub. Date: Jun. 19, 2014

(65) Prior Publication Data
US 2015/0338017 A1    Nov. 26, 2015

(30) Foreign Application Priority Data
Dec. 13, 2012   (IT) .............................. PD2012A0377

(51) Int. Cl.
| | |
|---|---|
| *F16M 11/24* | (2006.01) |
| *F16M 11/04* | (2006.01) |
| *G03B 17/56* | (2006.01) |
| *F16M 11/16* | (2006.01) |
| *F16M 11/32* | (2006.01) |

(52) U.S. Cl.
CPC .......... *F16M 11/245* (2013.01); *F16M 11/046* (2013.01); *F16M 11/16* (2013.01); *F16M 11/24* (2013.01); *F16M 11/32* (2013.01); *G03B 17/561* (2013.01)

(58) Field of Classification Search
CPC ............. G03B 17/561; F16M 11/245; F16M 11/046; F16M 11/16; F16M 11/24; F16M 11/32; F16M 11/34
See application file for complete search history.

(56) References Cited

U.S. PATENT DOCUMENTS 2,691,501 A   10/1954  Spencer

2008/0224000 A1*  9/2008  Yang ...................... F16M 11/16
                                                                     248/188.5

(Continued)

FOREIGN PATENT DOCUMENTS

| DE | 358638 C | 9/1922 |
|---|---|---|
| WO | 2005068895 A1 | 7/2005 |
| WO | 2010031208 A1 | 3/2010 |

OTHER PUBLICATIONS

ISR and Written Opinion in PCT/EP2013/074307 dated Feb. 21, 2014.

*Primary Examiner* — William Perkey
(74) *Attorney, Agent, or Firm* — Kristina Castellano; Castellano PLLC.

(57) ABSTRACT

A support tripod (1) for video-photographic equipment, comprising a spider (2), a column (8) provided with hooking means (9) for a piece of video-photographic equipment slidable along a sliding axis (Z) inside an aperture (7) defined by said spider (2), a plurality of legs (4) hinged at a hinging end (4a) to said spider (2) to open/close the tripod (1), each leg (4) having a body extending mainly along a longitudinal axis (Y) and being rotatable about a hinging axis (X) substantially perpendicular to said longitudinal axis (Y) and extending through the spider (2) to be moved between a closed configuration (W, W') in which the legs (4) are arranged almost parallel with the sliding axis (Z) and at least one operating configuration (K, J) in which the legs are inclined relative to the sliding axis (Z) at a desired opening angle ($\alpha 1$, $\alpha 2$), each leg (4) being provided with an adjusting device (30) in order to adjust the angular position of the leg (4) up to a maximum opening angle ($\alpha 1$, $\alpha 2$) relative to said sliding axis (Z), wherein said adjusting device (30) comprises an adjusting head (31) provided at the first hinging end (4a) actuatable in rotation about the longitudinal axis (Y) of the leg (4) and provided with translation means (40) cooperating with corresponding translation counter-means (41) defined on the leg (4) to translate the adjusting head (31) along the longitudinal axis (Y) relative to the leg (4), following the rotation about the longitudinal axis (Y), to vary the length of the leg (4) and the interference between the hinging end (4a) and the spider (2) to allow variation of the maximum opening angle ($\alpha 1$, $\alpha 2$) of the leg (4).

12 Claims, 7 Drawing Sheets

(56) References Cited

U.S. PATENT DOCUMENTS

2010/0019109 A1* 1/2010 Liu .................. F16M 11/34 248/168

2015/0196000 A1* 7/2015 Huang ................. F16M 11/245 248/440

2015/0338017 A1* 11/2015 De Faveri .............. F16M 11/16 396/428

* cited by examiner

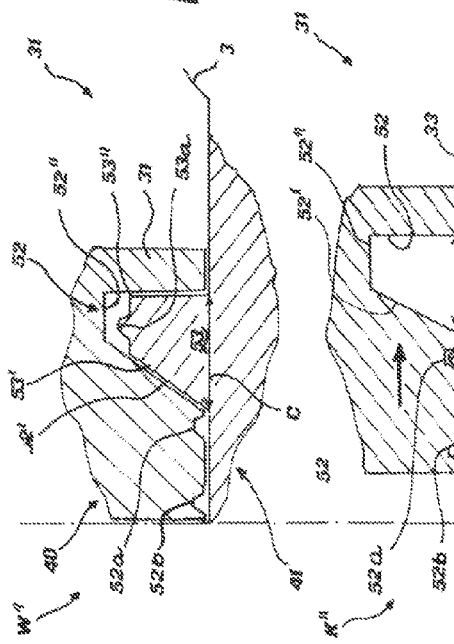
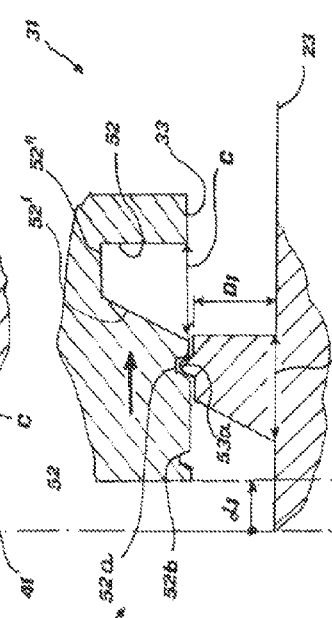
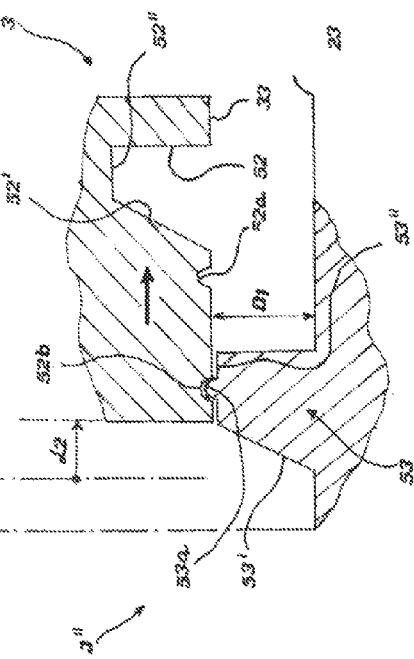
FIG.11A
FIG.11B
FIG.11C
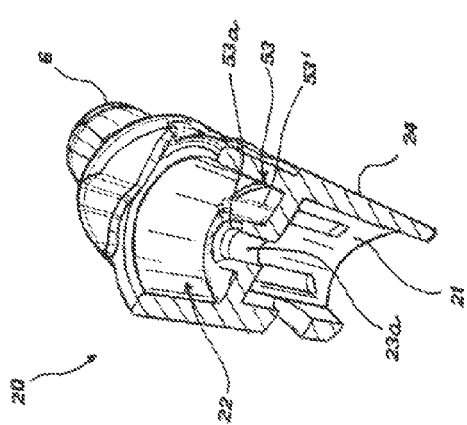
FIG.10

US 9,447,912 B2

SUPPORT TRIPOD FOR VIDEO-PHOTOGRAPHIC EQUIPMENT

CROSS REFERENCE TO RELATED APPLICATIONS

This application is a U.S. National Stage Application of PCT/EP2013/074307 filed on Nov. 20, 2013, which claims priority to Italian patent application PD2012A000377 filed on Dec. 13, 2012, the contents of both of which are incorporated herein by reference.

TECHNICAL FIELD

The present invention relates to a support tripod which is particularly but not exclusively intended for supporting video-photographic equipment, having the features set out in the preamble of the main claim.

TECHNOLOGICAL BACKGROUND

In the technical field of photography, it is widely known to use stands for supporting photographic equipment, among which tripods are particularly widespread and appreciated, both on an amateur level and on a professional level. Tripods generally comprise a plurality of legs, generally telescopic legs, all hinged to a spider in which a support column, to one end of which the piece of photographic equipment is fixed, is engaged with the ability to slide.

In the field of use, characteristics which are mutually contradictory are demanded of the tripods, that is to say, a high level of flexibility of positioning and maximized extension of the tripod in the operating state and, conversely, a reduced spatial requirement in a closed position in order to facilitate transport of the tripods themselves by the users.

In order to reconcile the above-mentioned requirements, there are used tripods provided with telescopic legs having a plurality of pull-out members which can be opened during use and can be closed in a closed position of the tripod in order to facilitate transport thereof.

It is further known to cause the support column to slide with respect to the spider in such a manner that it is enclosed, in a transport position, between the legs of the tripod in order to limit the total dimensions of the tripod itself.

In that version, the head of the column which is intended to receive a piece of video-photographic equipment during use is positioned in abutment against the spider of the tripod and is arranged externally with respect to the space occupied by the legs.

The reductions in dimensions which can be obtained are, however, limited.

WO2005/068895 filed in the name of the same Applicant discloses a tripod in which there is provision for the legs of the support to be closed in such a manner that the head of the tripod is positioned internally with respect to the space occupied by the legs.

A sleeve to which the support leg is hinged by means of a fork-like element is provided on the spider of the tripod disclosed in WO2005/068895 in the region of each support leg.

Two teeth which project from the outer surface of the sleeve itself are provided on the outer surface of the sleeve.

There is provided on the base of the fork-like element a lever which is accessible to the user from outside the tripod when the tripod is in an open position and which can be moved between three separate operating positions, in which the lever abuts the outer surface of the sleeve, the first and second teeth for positioning the tripod in a closed position and in two different operating positions in which the legs are opened out at predefined angles with respect to the spider, respectively.

A disadvantage of this tripod is that the lever projects outwards with respect to the space occupied by the spider in order to be gripped by the user. Therefore, it can be knocked accidentally and moved, thereby causing inadvertent movement of the tripod or damage thereto or a breakage.

Furthermore, the lever may remain entangled during transport or use and may be potentially damaged.

STATEMENT OF INVENTION

The problem addressed by the present invention is to provide a closable tripod for photographic equipment which is structurally and functionally configured to overcome the limitations set out above with reference to the cited prior art.

Within the context of that problem, an object of the invention is to provide a tripod whose positioning is simple and, at the same time, secure.

This problem is solved and this object is achieved by means of a closable tripod which is constructed in accordance with the appended claims.

More specifically, in the description and the claims below, the term "tripod" is intended to be understood to indicate a stand provided with a spider, to which a plurality of legs are articulated without specific limitations on the number of legs themselves which may be three or a number other than three.

BRIEF DESCRIPTION OF THE DRAWINGS

The features and advantages of the invention will be better understood from the detailed description of a preferred embodiment thereof which is illustrated by way of non-limiting example with reference to the appended drawings, in which:

FIG. 10 is an enlarged view of a detail of FIG. 9, FIGS. 11.a to 11.c are schematic views of a detail of the tripod of the invention in three different configurations.

PREFERRED EMBODIMENT OF THE INVENTION

Figure 1:
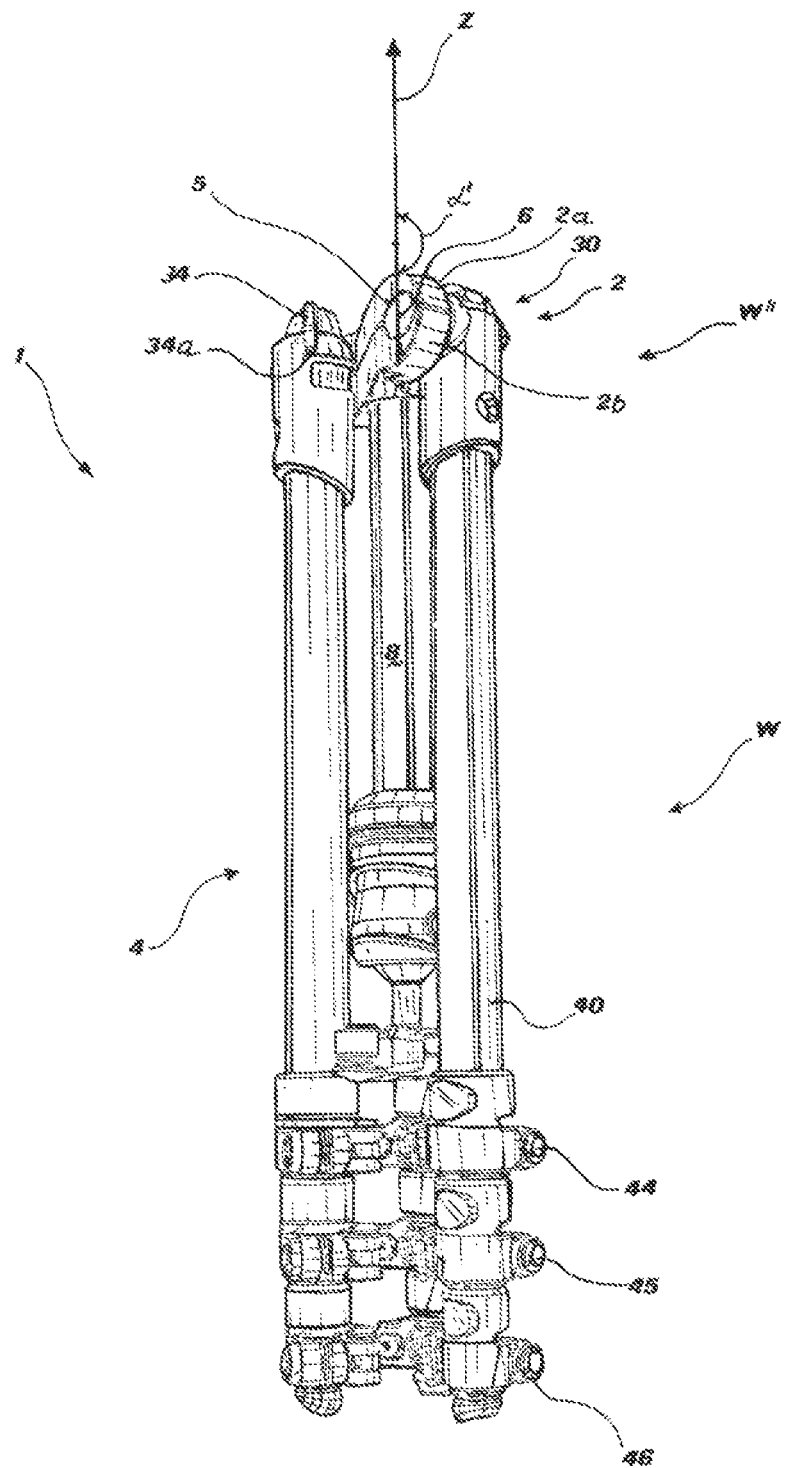
FIG. 1 is a front view of a tripod which is constructed in accordance with the present invention in a closed transport configuration.

In the Figures, there is generally designated 1 a tripod which is constructed in accordance with the present invention.

The tripod 1 comprises a spider 2 which is formed by two half-shells 2a, 2b which are mutually associated and formed in such a manner as to define a plurality of hinging end pieces, at each of which a leg 4 is hinged by means of an individual hinging end 4a. The two half-shells 2a and 2b are formed so as to define at each hinging end piece 3 a seat 5 for a hinge pin 6 which is rotatable about a rotation axis X in the two directions of the arrow F in order to allow the rotation of each leg 4 with respect to the spider 2.

The two half-shells 2a and 2b are further formed so as to define an opening 7 which is intended to receive with sliding engagement a column 8 of the tripod 1. The column 8 has at a first individual end a plate 9 provided with attachment means for securing a piece of video-photographic equipment, or a support head thereof which is not illustrated in the Figures, to the plate 9 and therefore to the column 8.

The column 8 can slide in the opening 7 along the axis Z so as to vary the spacing between the plate 9 and the spider 2, or the spatial requirement of the tripod 1 and/or the positioning height of the piece of video-photographic equipment.

There is further provided on the spider 2a locking key 11 which can be actuated by a user of the tripod 1 in order to unlock/lock the movement of the column 8 along the axis Z. The locking key 11 being rotated brings about the movement of a runner, which cannot be seen in the Figures and which is received in a sliding manner in a seat provided between the two half-shells 2a and 2b of the spider 2, towards/away from the opening 7, thereby locking the column 8 in a predetermined position in the opening 7 when the runner protrudes into the opening 7 and unlocking the column 8 when the runner is inside the spider 2 and does not project into the opening 7, respectively.

The legs 4 of the tripod 1 are structurally and functionally identical so that only one of them will be described below for the sake of brevity.

Each leg 4 of the tripod 1 has a tubular body 40 which is substantially cylindrical and which extends along a longitudinal axis Y between a support member 4b on the ground or a desired support surface and an opposing hinging end 4a, at which the leg 4 is hinged to the spider 2.

In the version shown, each leg 4 comprises three separate pull-out members 41-43 which can be inserted concentrically inside the tubular body 40 and which can be retracted in a sliding manner from the tubular body 40 itself for decreasing or increasing the length of the leg 4 along its own longitudinal axis Y, respectively.

Each pull-out member 41-43 of the leg 4 can be locked by way of locking means 44-46 in a desired position with respect to the leg 4, respectively, so as to lock the length of each leg 4.

There is provided on the tubular body 40 a hinging sleeve 20 which can be better seen in FIGS. 6 to 10 and which has a substantially cylindrical form and comprises an end piece which projects from an outer surface 24 of the sleeve 20 and which defines the hinge pin 6 of the leg 4 with respect to the spider 2.

The hinging sleeve 20 is internally substantially hollow and formed so as to define a first chamber 21 to which there is fixed the tubular body 40 of the leg 4 which is intended to receive end portions of the body 40 and the pull-out members 41-43 and a second chamber 22 which is separated by means of a baffle 23 from the first chamber 21 which is intended to receive an adjusting device 30 of the leg 4 arranged to adjust the position of the leg 4 with respect to the spider 2, as better explained below.

The baffle 23 is arranged transversely relative to the longitudinal axis Y of the leg 4 and is provided with a central opening 23a.

Two channels 26 and 27 separated by means of an edge 28 raised relative thereto are provided on the outer surface 24 of the cylindrical sleeve 20.

Figures 2, 4:
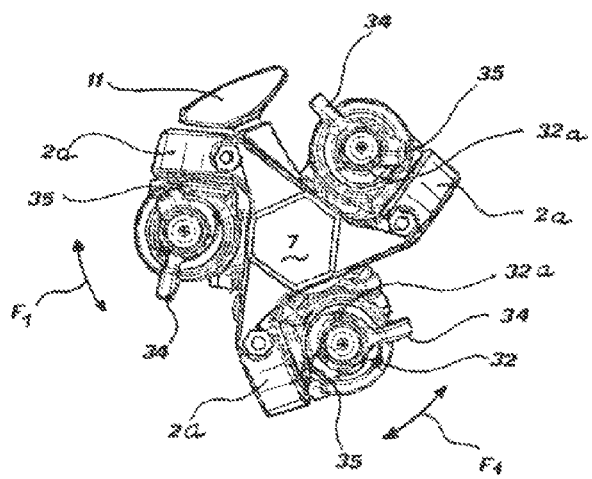
FIG. 2 is a view from below of the tripod of FIG. 1.
FIG. 4 is a view from above of the tripod of FIG. 3, with the column removed for reasons of clarity.

The adjusting device 30 is formed so as to adjust the rotation of the leg 4 with respect to the spider 2 about the rotation axis X through a rotation angle of at least approximately 180° between a closed configuration W' which is not shown in the Figures and in which the legs 4 are arranged practically parallel with each other and the axis Z, and the legs 4 and the plate 9 of the column 8 are positioned at opposite sides with respect to the spider 2, and a closed transport configuration W which is shown in FIGS. 1 and 2 and in which the legs 4 are arranged practically parallel with each other and the axis Z with the column 8 and the plate 9 positioned inside the space occupied by the legs 4.

The closed configuration W' is considered below, for the sake of convenience, to be the position in which the legs 4 are arranged at an angle $\alpha=0°$, that is to say, parallel with the axis Z extending through the spider 2, therefore the legs 4 are positioned at an angle $\alpha'=180°$ in the closed transport configuration W, that is to say, they are always practically parallel with the axis Z and in a symmetrical position with respect to the axis X.

The adjusting device 30 further also allows positioning of the legs 4 in, besides the two configurations described above, at least two different intermediate operating configurations, in which the legs 4 are in a position opened out through a given angle with respect to the axis Z; that angle is less than 180°, preferably less than 90° in the intermediate operating configuration.

The adjusting device 30 is formed so as to adjust the opening of each leg 4 in the at least two different intermediate operating configurations which will be described in greater detail below, up to a maximum opening angle with respect to the longitudinal axis Z, and to avoid further opening thereof with respect to the desired position, as will be better explained below.

The maximum opening angle of the legs is measured with reference to the axis Z, that is to say, from the position of the legs 4 in the closed configuration W', wherein it is considered, as mentioned, that the legs are positioned at an angle $\alpha=0°$.

Figure 7:
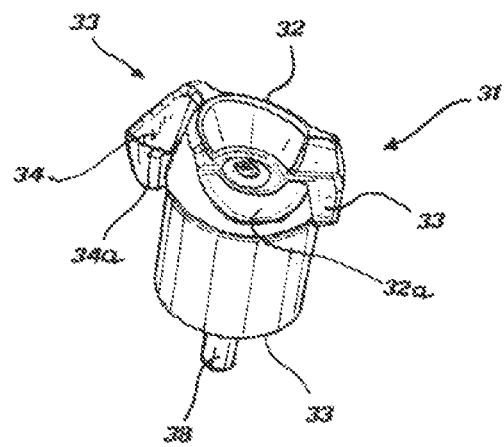
FIG. 7 is a perspective view of a detail of the tripod of the invention, drawn to an enlarged scale.
Figure 8:
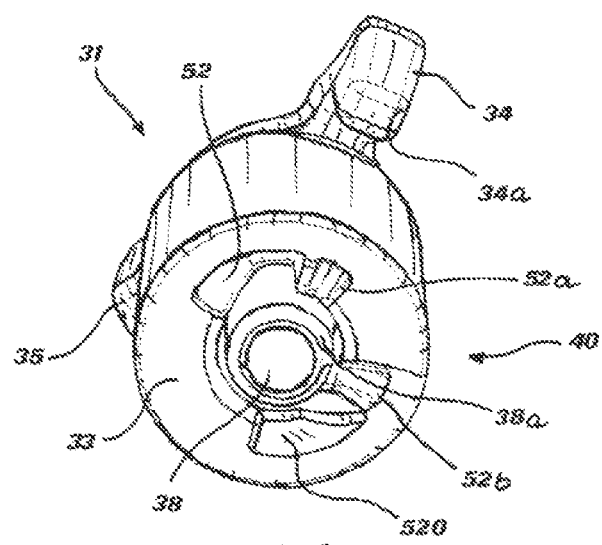
FIG. 8 is a view from below of the detail of FIG. 7.

The adjusting device 30 which can better be seen in FIGS. 6 to 10 comprises an adjusting head 31 which is shown in detail in FIGS. 7 and 8 and which is partially inserted into the second chamber 22 of the sleeve 20.

The adjusting head 31 can be moved inside the second chamber 22, in particular the adjusting head 31 is capable of rotation about the longitudinal axis Y and translation along the longitudinal axis Y inside the second chamber 22, as will be better explained below, between a retracted configuration W'' shown in FIG. 1 and a first deployed configuration K'' shown in FIG. 3, and a second deployed configuration J''' shown in FIG. 5.

In other versions not shown, the adjusting head 31 can be moved into additional deployed positions which are not shown in the Figures in order to allow the tripod 1 to be positioned in other intermediate operating configurations, as will be described in greater detail below, in which the legs are in a position opened-out through a given angle less than 180° with respect to the axis Z.

The adjusting head 31 is of almost tubular form and is provided with an external edge 32 which is positioned outside the second chamber 22 and which is directed during use towards the spider 2, and an internal edge 33 which is intended to be received in the second chamber 22. There is provided on the outer surface of the adjusting head 31 a gripping element 34 which is intended to be actuated by a user in order to rotate the adjusting head 31 about the longitudinal axis Y in the two directions of the arrow F1.

The gripping element 34 is formed so as to extend from the adjusting head 31 as far as the sleeve 20 in such a manner that one hook-like end 34a thereof is readily accessible to a user of the tripod 1 during the rotation of the adjusting head 31 about the axis Y in any configuration of the adjusting head 31.

The adjusting head 31 is further provided with abutment means which are defined in a circumferentially spaced-apart position on the head 31 and which are positioned to abut the spider 2 in the operating configurations of the support 1 in order to lock the adjusting head 31 in the above-mentioned intermediate operating configurations, as will be better described below.

In particular, in the version shown, the abutment means comprise an indentation 32a which is provided on the external edge 32 and a hook-like element 35 which protrudes from the adjusting head 31.

Figure 9:
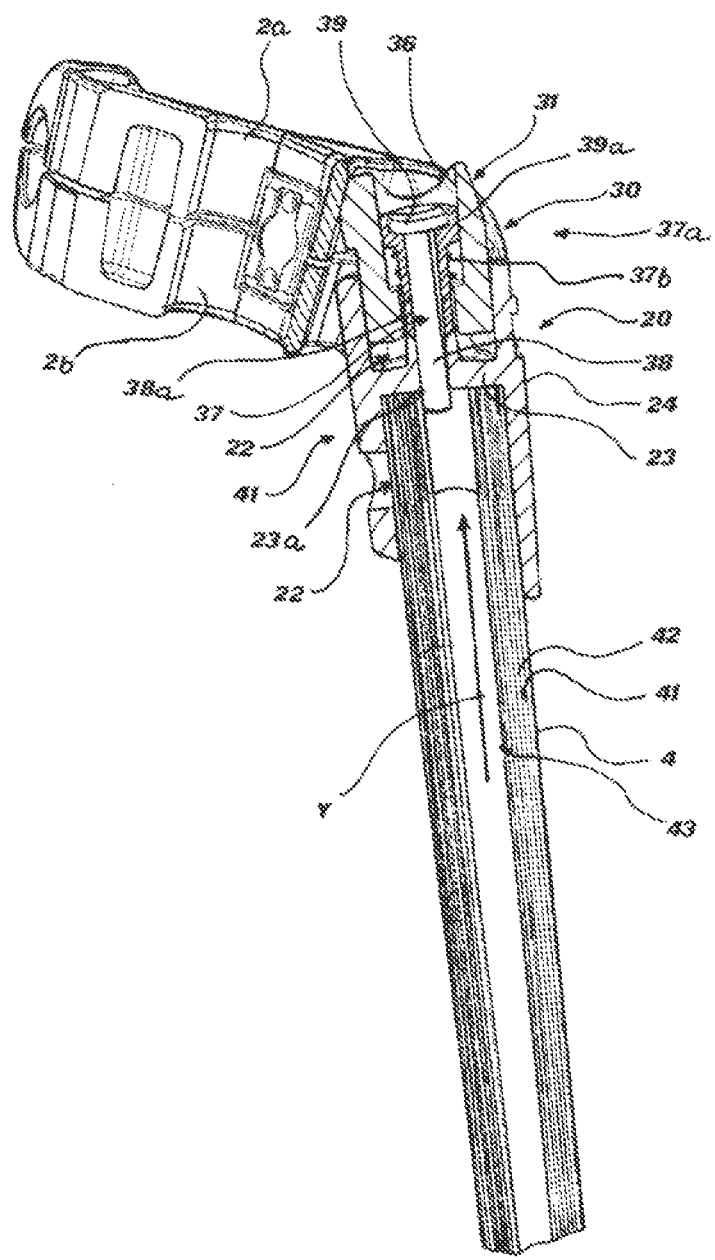
FIG. 9 is a cross-section of a detail of FIG. 3.

The adjusting head 31, as can better be seen in FIG. 9, is internally provided with a recess 36, inside which there is inserted a self-tapping screw 37 whose shank 38 is fixed to the central opening 23a provided in the baffle 23, whilst the head 39 is rotatably received by the recess 36.

There is provided between the screw 37 and the adjusting head 31 a spacing element 37a which is fixed to the screw 37 and which is provided with a head 39a interposed between the head 39 of the screw 37 and the internal wall of the adjusting head 31 and a member 38a interposed between the shank 38 and another central opening 33a provided on the internal edge 33 of the adjusting head 31.

Externally with respect to the spacing element 37a, there is provided a spring 37b which is biased so as to urge the adjusting head 31 against the sleeve 20. The presence of the spring allows the assembly comprising the adjusting head 31/sleeve 20 to be made more stable, preventing undesirable movements of the adjusting head away from the baffle 23.

The screw 37 is fixed both in translation and in rotation with respect to the baffle 23 and, therefore, to the sleeve 20 of the leg 4, whilst the rotation of the adjusting head 31 about the axis Y generates relative rotation and translation between the screw 37 and the adjusting head 31 about and along the axis Y, respectively.

The adjusting device 30 further comprises translation means 40 which cooperate with corresponding translation counter-means 41 in order to translate the adjusting head 31 along the longitudinal axis Y as a result of rotation of the adjusting head 31 about the longitudinal axis Y itself.

The translation means 40 and counter-means 41 are shown in greater detail in FIGS. 11.a to 11.c, in which the adjusting head 31 and the sleeve 20 are shown only partially and schematically for ease of reading.

In the version shown, the translation means 40 comprise a first and a second recess 52a, 52b and a groove 52 which are all defined at the internal edge 33 of the adjusting head 31, the translation counter-means 41 comprising a protrusion 53 defined on the baffle 23 on the surface directed during use towards the adjusting head 31 and extending along a circumferential arc C' of approximately 60° of the baffle 23 itself.

The groove 52 extends over another circumferential arc C of approximately 60°, has a depth which is variable over the other circumferential arc C and comprises a ramp 52' having an inclined surface and a planar portion 52" which is defined in the zone with greater spacing from the internal edge 33 and substantially parallel therewith.

The protrusion 53 is formed so as to comprise another ramp 53' which defines an inclined plane which projects with a projection which varies with respect to the longitudinal axis Y with respect to the baffle 23 and an apical portion 53", that is to say, a portion with greater spacing from the baffle 23 and substantially parallel therewith.

There is provided on the apical portion 53" of the protrusion 53 a protuberance 53a which is formed so as to be connected in a form-fitting manner to the first recess 52a and second recess 52b in order to be able to be received therein, as will be better explained below.

In other versions which are not shown, there may be provided a different number of grooves and protrusions, the number of grooves and protrusions being equal to each other, so that each protrusion 53 is positioned so as to be facing a corresponding groove 52 in order to cooperate therewith in order to generate a translation of the adjusting head 31 along the longitudinal axis Y as a result of rotation thereof about that axis.

In particular, there may be provided another groove 520 which is positioned on the internal edge 33 in a symmetrical position with respect to the groove 52 which is intended to receive another protrusion which is not shown in the Figures.

The presence of the other groove 520 allows the adjusting head to be made more stable during the rotation about the longitudinal axis Y preventing inclinations thereof.

In other versions which are not shown, there may be provided a different number of recesses in the adjusting head 31, each one intended to receive the protuberance 53a in a specific operating configuration of the adjusting head 31 so as to be able to position the legs 4 in a corresponding number of intermediate operating configurations.

By the adjusting head 31 being rotated with respect to the longitudinal axis Y in the direction of the arrow F1, the internal edge 33 is rotated with respect to the baffle 23, thereby moving the groove 52 and the first recess 52a and second recess 52b with respect to the protrusion 53.

In particular, by the adjusting head 31 being rotated about the axis Y from the retracted configuration W", shown in FIG. 11.a, the protrusion 53 and the groove 52 are mutually moved, the ramp 52' and the other ramp 53' slide one relative to the other, guiding the progressive exit of the protrusion 53 from the groove 52 and causing the translation of the adjusting head 31 along the longitudinal axis Y away from the baffle 23.

The adjusting head 31 projects partially from the second chamber 22 and increases the dimension of the leg 4 along the longitudinal axis Y.

By the rotation of the adjusting head 31 being continued, the protrusion 53 is completely pulled out of the groove 52 and subsequently the protuberance 53a is moved into correspondence with the first recess 52a and inserted therein.

In that position, the internal edge 33 of the adjusting head 31 is spaced apart by a distance "d1" from the baffle 23 and the adjusting head 31 is in the first deployed configuration K" shown in FIG. 11.b.

By further rotating the adjusting head 31 about the longitudinal axis Y, the protuberance 53a is moved into correspondence with the second recess 52b and inserted therein.

In that position, the internal edge 33 of the adjusting head 31 is spaced apart by a distance "d1" from the baffle 23 and the adjusting head 31 is in the second deployed configuration J" shown in FIG. 11.c.

By further rotating the adjusting head 31 about the longitudinal axis Y, it is again possible to move the protrusion inside the groove, again bringing the adjusting head 31 into a retracted configuration W".

Therefore, the rotation of the adjusting head 31 about the longitudinal axis Y away from or towards the retracted configuration W''' causes a movement of the head 31 along the longitudinal axis Y towards or away from the baffle 23 and the spider 2, respectively, thereby varying the total spatial requirement along the longitudinal axis Y of the adjusting device 30 and the interference thereof with the spider 2.

Therefore, the total spatial requirement of the leg 4 along the longitudinal axis Y varies and, therefore, the interference thereof with the spider 2; the total spatial requirement of the leg 4 along the longitudinal axis Y is at a minimum in the retracted configuration W''' and at a maximum in the deployed configurations K'', J'''. The movement of the adjusting head 31 between the two deployed configurations K'' and J''' does not cause another translation of the adjusting head 31 along the longitudinal axis Y and, therefore, a variation in the extension of the leg 4 along the longitudinal axis Y.

There will now be described in detail below the main operating configurations of the tripod 1 of the invention and the relevant configurations of the adjusting device 30.

FIG. 1 shows the tripod 1 in a closed transport configuration W, in which, as mentioned, the legs 4 are positioned almost parallel with the axis Z at an angle α of approximately 180°.

The legs 4 are arranged almost parallel with each other and the column 8, the column together with the plate 9 being positioned inside the space occupied by the legs 4.

In that configuration, the adjusting head 31 is in a retracted configuration W''', which is shown in FIG. 11.a, that is to say, in the position inserted for the most part in the second chamber 22, the protrusion 53 is inserted inside the groove 52, the internal edge 33 of the adjusting head 31 is substantially in abutment with the baffle 23.

In the closed transport configuration W, therefore, the extension of each leg 4 along the longitudinal axis Y is at a minimum with respect to the other operating configurations of the tripod 1 of the invention.

In the retracted configuration W''' of the adjusting head 31, the gripping element 34 is arranged externally or at the opposite side to the spider 2 so as to be able to be freely gripped by the user in order to rotate the adjusting head 31.

Furthermore, in that configuration the adjusting head 31 and therefore the legs are not in interference with the spider 2 and, therefore, the operator can freely rotate the legs 4 from the closed transport configuration W about the rotation axis X in order to move them, if desired, from that configuration.

From the closed transport configuration W, the user can rotate the legs 4 through approximately 180°, bringing them into the closed configuration W', and/or through a desired angle of less than 180°, and can bring them into a desired intermediate operating configuration by acting on the adjusting device 30, and can adjust, still by means of the adjusting device 30, the position of the legs 4 in the desired operating configuration, preventing direct rotation thereof towards an increase of the angle of the legs 4 with respect to the axis Z.

Figure 3:
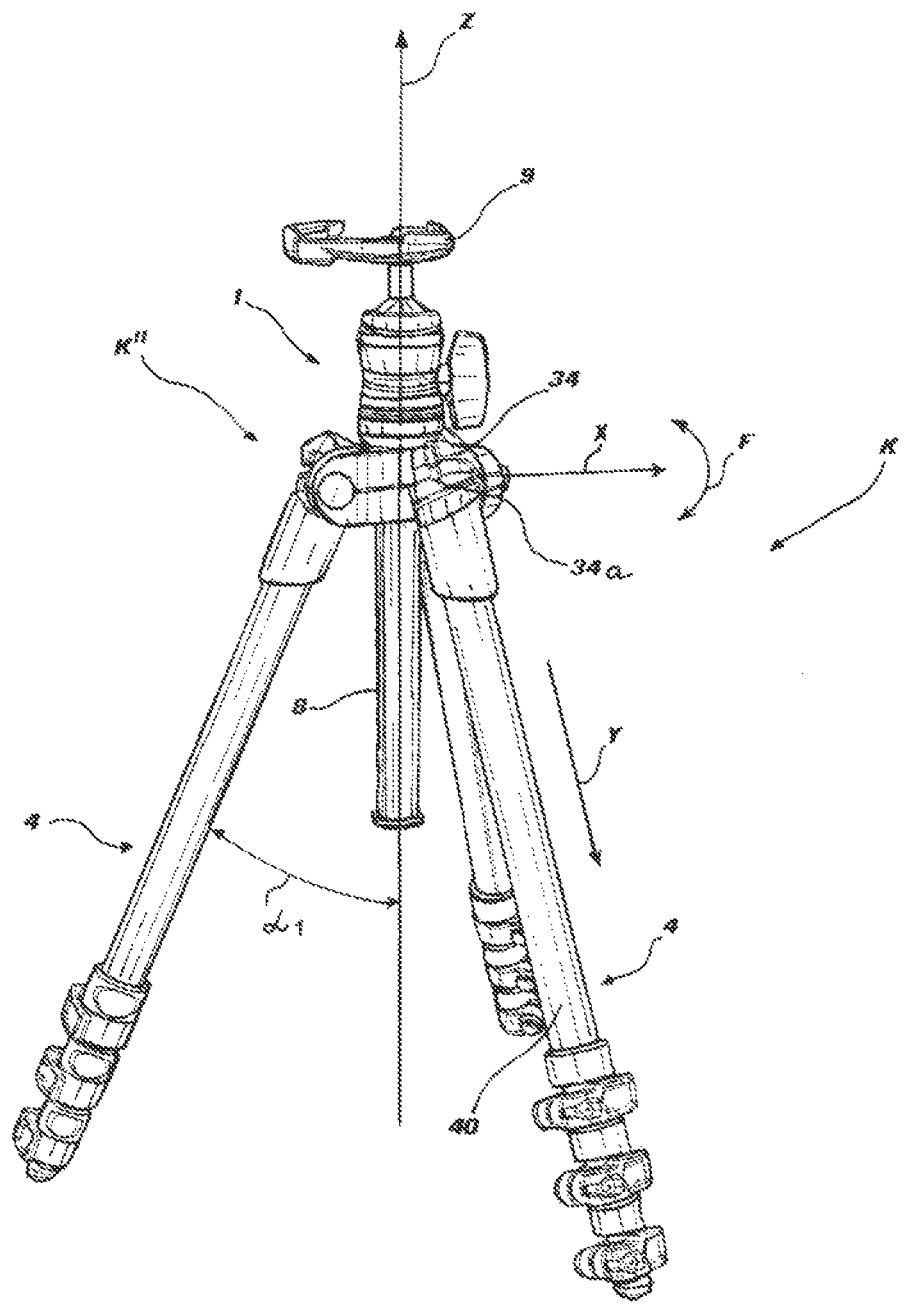
FIG. 3 is a perspective view of the tripod of FIG. 1 in a first operating position.

FIG. 3 shows the tripod 1 in a first operating configuration K, in which the legs 4 of the tripod 1 are opened out with respect to the spider 2 and are positioned with respect thereto, at the side opposite the plate 9 and positioned at a first operating angle α1 considered, as mentioned, with respect to the axis Z.

The operating angle α1 has a value of approximately 30°.

In order to adjust the opening of the legs 4 in the first operating configuration K, the operator provides for rotation of the adjusting head 31 about the longitudinal axis Y with respect to the retracted configuration W''' until it is moved into the first deployed position K'' shown in FIG. 11.b.

In that configuration, the abutment element 35 is directed towards the spider 2 and is arranged to abut it, and the protuberance 53a is inserted in the first recess 52a and the internal edge 33 is spaced apart by a distance "d1" from the baffle 23.

In that configuration, the abutment element 35 forms a securing element for the leg 4, preventing movements thereof from the angle predefined for the first operating configuration K.

In other words, by the tripod 1 being supported on the ground or on a desired support surface, the weight of the tripod itself and/or the piece of equipment fixed to the plate 9 would tend to open the legs 4 out further, that is to say, increasing the angle thereof with respect to the axis Z and rotating them towards the closed transport configuration W. That rotation is impeded by the interference between the abutment element 35 of the adjusting device 30 and the spider 2.

In the first operating configuration K, the first deployed configuration K'' of the adjusting device 30 prevents further rotation of the legs 4 beyond the first operating angle α1, whilst the movement towards the closed configuration W' would be possible but is prevented by the friction applied by the two half-shells 2a and 2b of the spider 2 to each hinge pin 6 of each leg 4.

If the operator decides to move the legs from the first operating configuration K in order to bring them into the closed configuration W', he lifts the legs 4 off the ground or support surface, rotates them about the hinge pin 6 and rotates the adjusting head 31 in order to bring it into the retracted position W'''.

Figure 5:
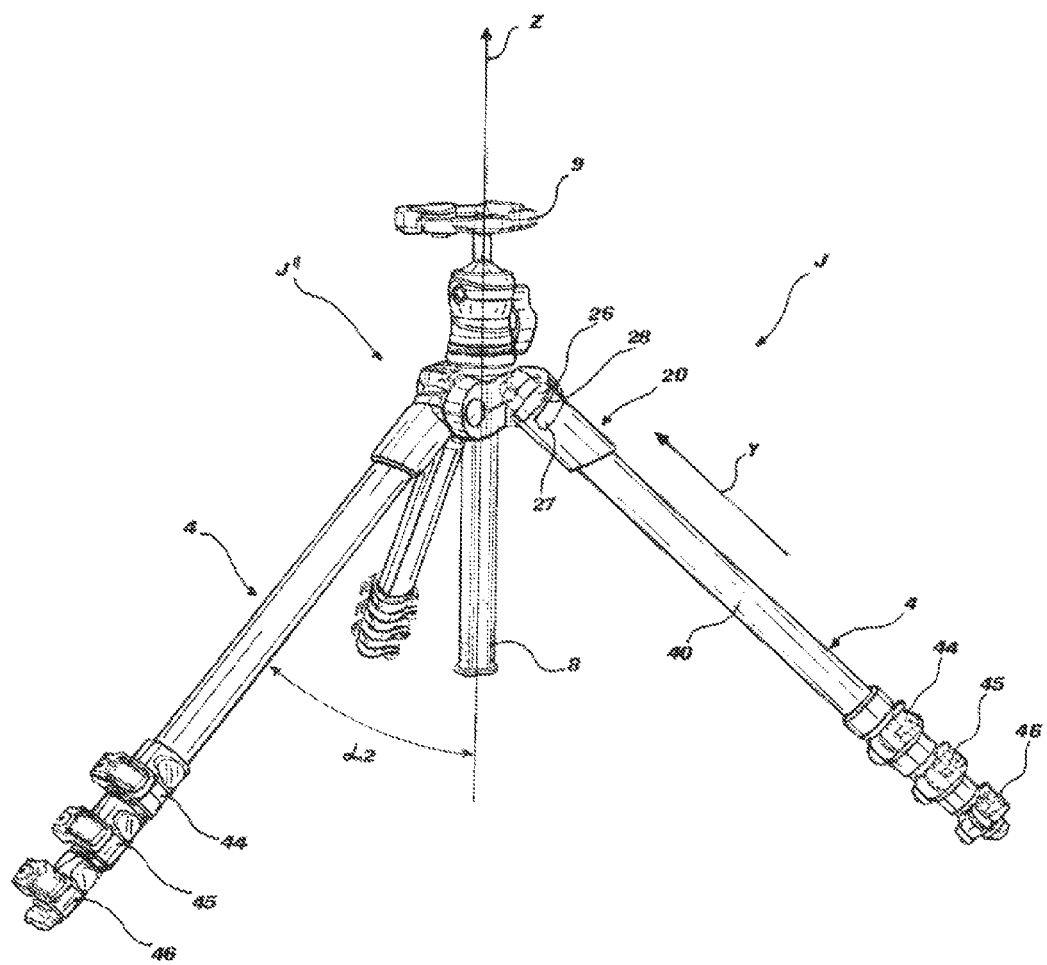
FIG. 5 is a perspective view of the tripod of FIG. 1 in a second operating position.
Figure 6:
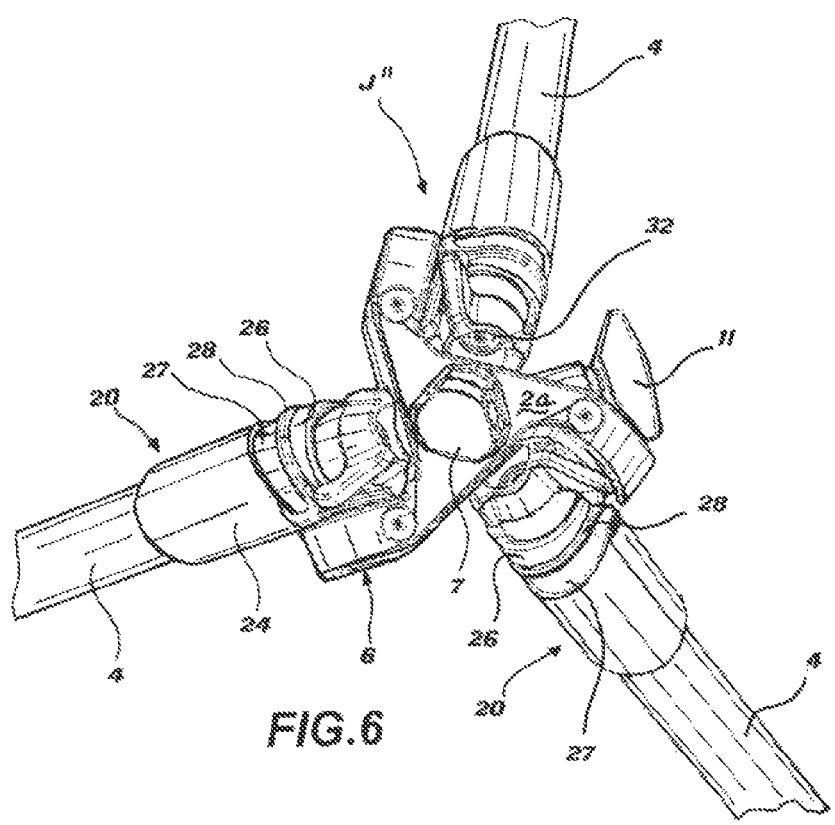
FIG. 6 is a broken-away view from above of the tripod of FIG. 5 with the column removed for reasons of clarity.

FIG. 5 shows the tripod 1 in a second operating configuration J in which the legs 4 of the tripod are opened out with respect to the spider 2, through a second operating angle α2 which is greater than the first operating angle α1 of the first operating configuration K.

In that configuration, the legs 4 are positioned at a second operating angle α2 of approximately 60° with respect to the axis Z, the adjusting head 31 is in the second deployed configuration J'''.

In order to adjust the opening of the legs 4 in the second operating configuration J, in order to prevent an increase in the second operating angle α2, the operator provides for rotation of the adjusting head 31 about the longitudinal axis Y, bringing the protuberance 53a into correspondence with the second recess 52b, therefore bringing the head into the second deployed configuration J'''.

The internal edge 33 of the adjusting head 31 is maintained at the distance "d1" from the baffle 23 of the first deployed configuration K''.

In the second operating configuration J, the hook-like end 34a of the gripping element 34 is arranged near the external edge 20a of the sleeve 20 and the indentation 32a is directed towards the spider 2 and positioned so as to abut it, preventing further rotation of the legs 4 with respect to the preselected position.

In this case, the adjusting device 30 and in particular the adjusting head 31 also allow adjustment of the position of the legs 4, preventing further rotation thereof beyond the second operating angle α2 whilst the movement towards the closed configuration W' would be possible but is prevented by the friction applied by the two half-shells 2a and 2b to the hinge pin 6.

The adjusting head 31 is rotated through approximately 60° in order to be moved between the three operating configurations described above.

In order to move the legs 4 of the tripod 1 between the configurations described above, the user provides for gripping the first hook-like element 34, rotating the adjusting head 31 until it is brought into the desired position. That rotation involves a relative rotation between the groove 52 and the protrusion 53 and optionally a translation of the adjusting head 31 along the longitudinal axis Y.

The rotation/translation of the adjusting head 31 brings about a variation in the interference between the adjusting head 31 and the spider 2 and therefore a different angulation of positioning of the leg 4 with respect to the spider 2.

That variation in interference being caused either by the variation of the total length of each leg 4 along the longitudinal axis Y or by the different formation of the portion of the adjusting head 31 directed towards the spider 2 in a predetermined position, that is to say, in the case being discussed, the indentation 32a or the abutment element 35.

In other versions which are not shown, the adjusting head may be provided with a different number of recesses provided to receive in a form-fitting manner the protuberance so as to allow the legs to be positioned in a corresponding number of operating configurations with respect to the spider.

In other versions which are not shown, each leg may comprise a number of pull-out members other than three in accordance with the specific requirements of the tripod.

Furthermore, in other versions which are not shown, there may be provided translation means and counter-means which are different from those set out and suitable for allowing a translation of the adjusting head 31 along the axis Y as a result of a rotation thereof along that axis.

The invention claimed is:

1. A support tripod for video-photographic equipment, comprising a spider, a column provided with hooking means for a piece of video-photographic equipment slidable along a sliding axis (Z) inside an aperture defined by said spider, a plurality of legs hinged at a hinging end to said spider to open/close said tripod, each leg having a body extending mainly along a longitudinal axis (Y) and being rotatable about a hinging axis (X) substantially perpendicular to said longitudinal axis (Y) and extending through said spider to be moved between a closed configuration (W, W') in which said legs are arranged almost parallel with said sliding axis (Z) and at least one operating configuration (K, J) in which the legs are inclined relative to said sliding axis (Z) at a desired opening angle ($\alpha 1$, $\alpha 2$), each leg being provided with an adjusting device arranged to adjust the angular position of said leg up to a maximum opening angle ($\alpha 1$, $\alpha 2$) relative to said sliding axis (Z), wherein said adjusting device comprises an adjusting head provided at said first hinging end actuatable in rotation about the longitudinal axis (Y) of the leg and provided with translation means cooperating with corresponding translation counter-means defined on said leg to translate the adjusting head along the longitudinal axis (Y) relative to said leg, following said rotation about said longitudinal axis (Y), to vary the length of said leg and the interference between said hinging end and said spider to allow variation of said maximum opening angle ($\alpha 1$, $\alpha 2$) of said leg.

2. The tripod according to claim 1, wherein said adjusting device is configured so as to allow the legs to be rotated between a first closed configuration (W'), in which said legs are arranged almost parallel with the sliding axis (Z) and said legs and said column are positioned on opposite sides relative to said spider, and a closed transport configuration (W) in which said legs are rotated through approximately 180° relative to said first closed configuration (W'), wherein said column is positioned within the space taken up by said legs.

3. The tripod according to claim 2, wherein said leg comprises a sleeve for hinging to said spider, said sleeve comprising a chamber wherein said adjusting head is accommodated so as to be slidable and translatable along the longitudinal axis (Y).

4. The tripod according to claim 3, wherein said translation means and said translation counter-means are defined respectively on said adjusting head and on a base of said chamber or vice versa, in order to be reciprocally translatable along the longitudinal axis (Y) following a rotation of said adjusting head about said longitudinal axis (Y).

5. The tripod according to claim 2, wherein said adjusting head is provided with a retracted configuration (W") in which the translation means are coupled in form coupling to the translation counter-means, said adjusting head being in a close position to a base of the chamber so as not to interfere with said spider.

6. The tripod according to claim 5, wherein said translation means and said translation counter-means respectively comprise at least one groove and at least one recess having a depth less than the depth of said groove and at least one protrusion or vice versa, reciprocally displaceable to move said adjusting head along the longitudinal axis (Y) following a rotation of said adjusting head about said longitudinal axis (Y).

7. The tripod according to claim 6, wherein, in said retracted configuration (W"), said at least one protrusion is inserted into said at least one groove, said at least one protrusion and said at least one groove being formed so as to be connected to each other with form coupling.

8. The tripod according to claim 2, wherein said adjusting head is provided with at least one deployed configuration (K", J") with respect to said chamber, in which said adjusting head is spaced apart from a base of said chamber by a desired distance (d1), and adjusting means provided on said adjusting head abutting said spider in order to adjust the position of said legs up to a maximum opening angle ($\alpha 1$, $\alpha 2$).

9. The tripod according to claim 1, and further comprising an actuating element defined on the adjusting head and arranged so as to be gripped by a user to rotate said adjusting head about said longitudinal axis (Y).

10. The tripod according to claim 1, and further comprising a thrust element arranged to urge said adjusting head against said leg so as to keep said translation means and said translation counter-means mutually coupled.

11. The tripod according to claim 5, wherein said adjusting head is provided with at least one deployed configuration (K", J") with respect to said chamber, in which said adjusting head is spaced apart from a base of said chamber by a desired distance (d1), and adjusting means provided on said adjusting head abutting said spider in order to adjust the position of said legs up to a maximum opening angle ($\alpha 1$, $\alpha 2$).

12. The tripod according to claim 11, wherein, in said at least one deployed configuration (K", J"), said at least one protrusion is arranged at said at least one recess, a protuberance of said protrusion being inserted into said at least one recess.

* * * * *